United States Patent [19]

Luch

[11] Patent Number: 5,348,182
[45] Date of Patent: * Sep. 20, 1994

[54] MEANS FOR ATTACHING FITMENT AND METHOD OF APPLYING FITMENT

[75] Inventor: Daniel Luch, Los Gatos, Calif.

[73] Assignee: Portola Packaging, Inc., San Jose, Calif.

[*] Notice: The portion of the term of this patent subsequent to Apr. 19, 2011 has been disclaimed.

[21] Appl. No.: 831,806

[22] Filed: Feb. 5, 1992

Related U.S. Application Data

[63] Continuation-in-part of Ser. No. 664,658, Mar. 5, 1991, abandoned, which is a continuation-in-part of Ser. No. 771,057, Oct. 2, 1991, abandoned.

[51] Int. Cl.$^5$ .............................................. B65D 51/18
[52] U.S. Cl. ..................... 220/256; 220/258; 220/266; 220/288; 215/253; 222/541; 229/125.15
[58] Field of Search ............... 220/254, 256, 258, 265, 220/266, 276, 281, 288, 307; 229/125.15; 215/253, 258, 365; 222/541

[56] References Cited

U.S. PATENT DOCUMENTS

| | | | |
|---|---|---|---|
| 1,332,686 | 3/1920 | Reynolds | 285/202 |
| 1,737,182 | 11/1929 | Bell | 220/288 |
| 1,799,244 | 4/1931 | Parish | 220/288 X |
| 1,891,033 | 12/1932 | Wackman | 220/288 X |
| 2,080,881 | 5/1937 | Wackman | 285/203 X |
| 2,245,430 | 6/1941 | Courtright et al. | 285/202 |
| 2,400,716 | 5/1946 | Sattler | 229/125.15 X |
| 3,021,976 | 2/1962 | Tracy | 220/254 X |
| 3,083,858 | 4/1963 | Biedenstein | 220/27 |
| 3,187,966 | 6/1965 | Klygis | 222/541 |
| 3,405,837 | 10/1968 | Carpenter, Jr. | 220/265 X |
| 3,608,771 | 9/1971 | Monroe | 220/266 |
| 3,966,080 | 6/1976 | Bittel | 220/269 |
| 3,998,354 | 12/1976 | Song | 220/269 |
| 4,019,663 | 4/1977 | Krautkramer | 215/32 X |
| 4,146,148 | 3/1979 | Dwinell et al. | 220/270 |
| 4,149,651 | 4/1979 | Ignell | 220/265 |
| 4,174,051 | 11/1979 | Edwards et al. | 222/105 |
| 4,231,486 | 11/1980 | Bock | 220/266 |
| 4,669,640 | 6/1987 | Ando et al. | 222/541 |
| 4,708,255 | 11/1987 | Thompson | 215/329 |
| 4,709,824 | 12/1987 | Thompson | 215/252 |
| 4,785,963 | 11/1988 | Magley | 220/266 |
| 4,793,506 | 12/1988 | Thompson | 215/344 |
| 4,811,857 | 3/1989 | Thompson | 215/329 |
| 4,813,578 | 3/1989 | Gordon et al. | 220/258 X |
| 4,823,967 | 4/1989 | Thompson | 215/222 |
| 4,830,273 | 5/1989 | Kalberer et al. | 229/123.1 |
| 4,856,667 | 8/1989 | Thompson | 215/318 |
| 4,872,304 | 10/1989 | Thompson | 53/487 |
| 4,909,434 | 3/1990 | Jones et al. | 220/288 X |
| 4,964,562 | 10/1990 | Gordon | 220/288 X |
| 5,020,686 | 6/1991 | Dutt | 220/276 |

FOREIGN PATENT DOCUMENTS

| | | | |
|---|---|---|---|
| 1057012 | 5/1959 | Fed. Rep. of Germany | 270/265 |
| WO9003919 | 4/1990 | PCT Int'l Appl. | B65B 3/06 |
| 449370 | 6/1936 | United Kingdom | 285/202 |

OTHER PUBLICATIONS

Capitol Spout advertisement—date uncertain.

Primary Examiner—Allan N. Shoap
Assistant Examiner—Vanessa Caretto
Attorney, Agent, or Firm—Julian Caplan

[57] ABSTRACT

A fitment to be attached to an apertured wall of a container or the like is initially formed (as by plastic molding) with a thin cylindrical plastic molding) with a thin cylindrical wall dimensioned to fit inside the aperture in the container. A flange is formed on the exterior of the cylindrical wall to fit against the exterior of the container wall, surrounding the aperture therein. Preferably the flange slants downward-outward. A curling tool is forced against the end of cylindrical wall, curling it outward-upward to fit tightly against the interior of the container wall opposite the flange, thereby crimping the fitment to the container. Curling of the cylindrical wall may be performed either before or after the fitment is installed on the carton. The fitment is formed to be closed by a cap and preferably to engage the cap in a tamper-evident manner. In a preferred form of the invention the cap and fitment are initially molded as a unitary member.

10 Claims, 2 Drawing Sheets

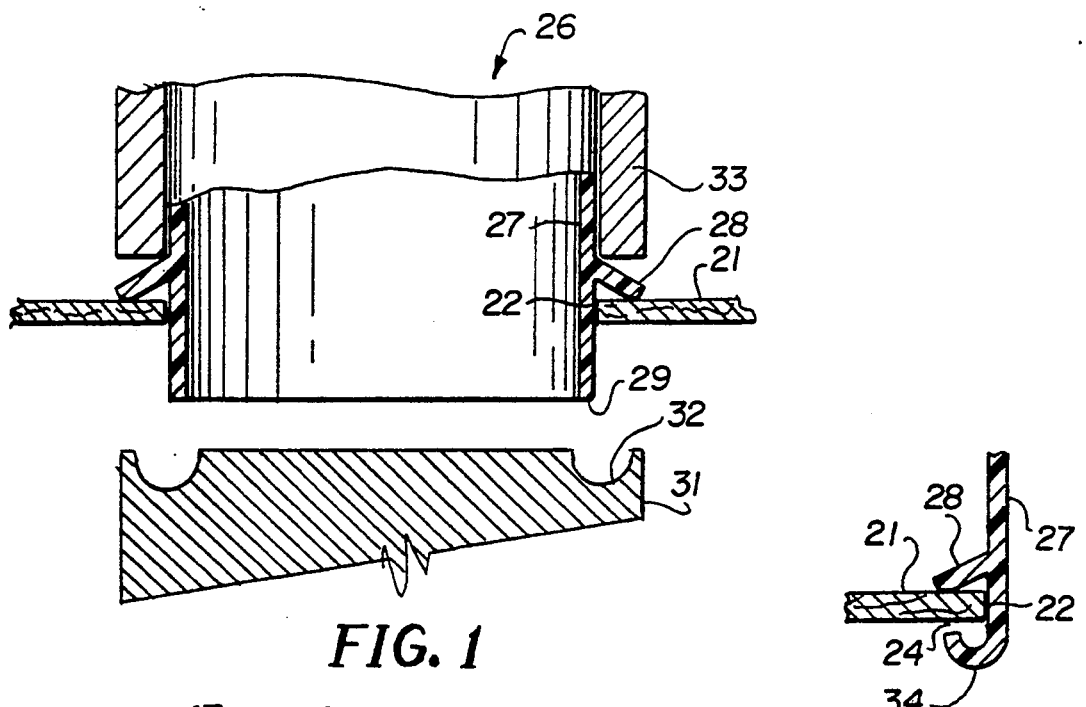
FIG. 1
FIG. 2
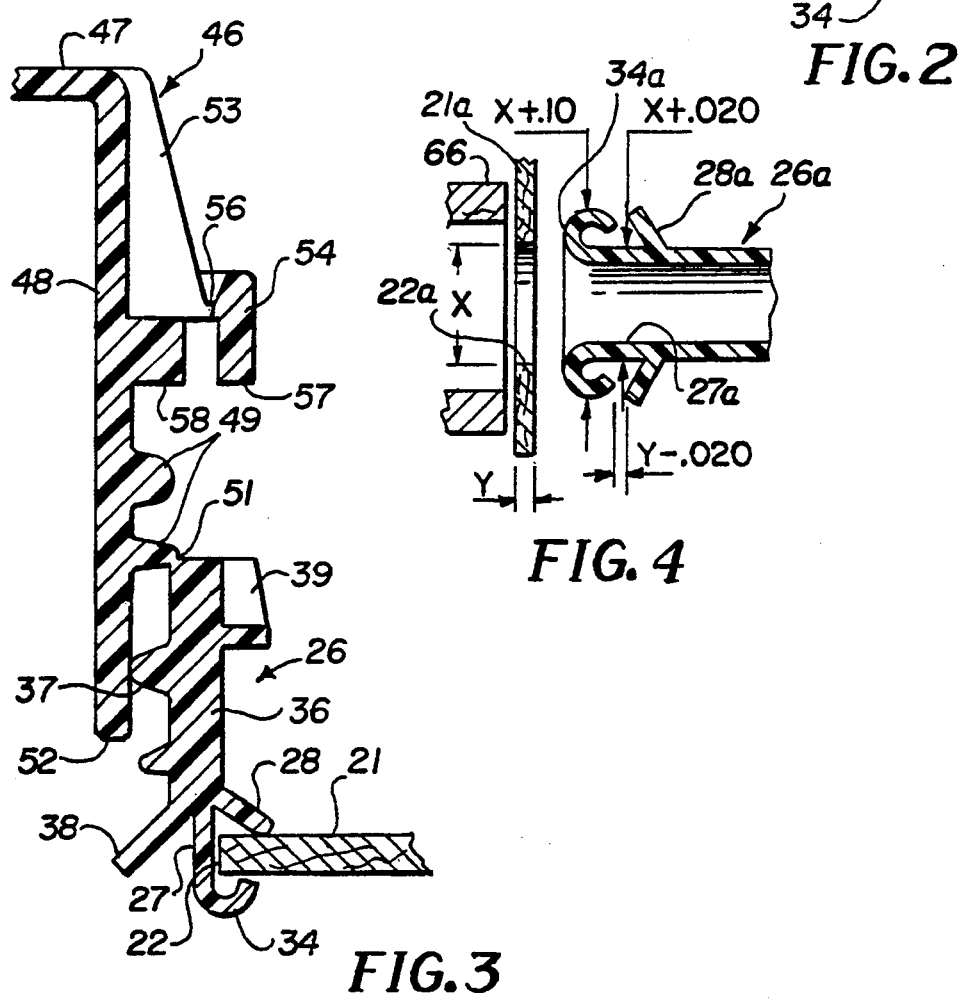
FIG. 3
FIG. 4

MEANS FOR ATTACHING FITMENT AND METHOD OF APPLYING FITMENT

CROSS-REFERENCE TO RELATED APPLICATIONS

This application is a continuation-in-part of copending U.S. patent applications Ser. No. 07/664,658 filed Mar. 5, 1991, now abandoned, and Ser. No. 07/771,057 filed Oct. 2, 1991, now abandoned.

BACKGROUND OF THE INVENTION

1. Field of the Invention:

This invention relates to a new and improved tamper-evident fitment and closure and method of applying same to a container panel. More particularly the invention relates to the connection of a fitment to an apertured container panel wherein the fitment is provided with a thin cylindrical wall which fits through the aperture in the panel and is then curled outwardly to crimp against the panel and hold the fitment firmly in place.

2. Description of Related Art:

The related art in fitments and closures therefor is discussed in detail in the aforesaid U.S. patent applications Ser. No. 07/664,658 and Ser. No. 07/771,057. The present invention is an improvement on certain of the modifications shown in the aforesaid applications to simplify the connection of the fitment to the container panel.

Curling of thin walled plastic cylinders is known in the art. For example, applying a concave tool to the edge of a cylindrical plastic member is shown in numerous patents to Thompson, such as, U.S. Pat. Nos. 4,708,255; 4,709,824; 4,793,506; 4,872,304; 4,823,967; 4,811,857; and 4,856,667. These patents disclose a curled bead which is resilient and is compressed when a screw closure is applied to a container neck. Similar curling techniques are employed in the present invention, but the curled flange is employed for a totally different purpose; namely, to curl the downward projecting cylinder of the fitment so as to crimp it in place around the aperture in a container panel.

SUMMARY OF THE INVENTION

The fitment has a pouring spout formed with locking and sealing internal beads. The closure therefore has a top with a depending skirt. Optionally, initially the fitment and closure may be molded as a single unitary member, the two parts being joined together by a frangible link. The link may be broken by pushing down on the closure, whereupon a skirt which depends from the top of the closure slides inside the spout of the fitment. Cooperating locking beads on the skirt and spout hold the closure in closed position. Further, a sealing bead on the inside of the spout seals against a sealing surface on the skirt.

So long as the cap and spout are in their initial molded position and the frangible link connecting them is intact, the spout and closure are tamper-evident. However, the frangible link may be broken and the closure inserted in the fitment at the time of manufacture of the product. To make the later preassembled version tamper-evident, cooperating tamper-evident means on the closure and fitment are employed.

In the present invention, a thin cylindrical skirt extends down from the fitment and is dimensioned to fit inside the aperture in a panel of a container such as a paper board container. A curling tool is brought against the bottom edge of the cylinder causing the material to curl outwardly and engage the underside of the panel, tightly clamping the panel between the curl and a flange formed on the fitment which is positioned on the opposite side of the panel.

In a modification of the invention, the curl in the cylinder may be formed prior to assembly of the fitment and panel and may be pushed through the aperture in the panel and caused to engage the panel in a manner similar to the preceding modification.

In still another modification of the invention, the closure may be made suitable for aseptic packaging by welding a foil sheet to the curled portion of the fitment and to the carton panel outside of the curl and, preferably, to the bottom edge of the skirt of the closure.

BRIEF DESCRIPTION OF THE DRAWINGS

FIG. 1 is a fragmentary somewhat schematic vertical sectional view showing the commencement of operation of curling the thin cylinder of a fitment around the inside of the panel of a carton;

FIG. 2 is a fragmentary view showing completion of the operation;

FIG. 3 is an enlarged vertical sectional view through a portion of the closure and fitment and the panel to which it is attached;

FIG. 4 is a schematic view showing a pre-curled fitment and carton panel prior to assembly;

DETAILED DESCRIPTION OF THE PREFERRED EMBODIMENTS

Figure 5:
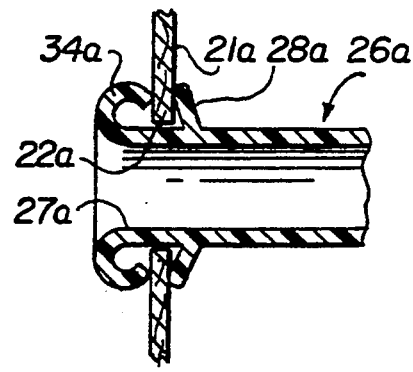
FIG. 5 is a view similar to FIG. 4 showing completion of the operation.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

A preferred use for the present invention is the attachment of a fitment 26 to a container wall panel 21 formed with an aperture 22. Directing attention first to FIGS. 1 and 2, fitment 26 has a dependent thin cylindrical wall 27 having a lower end 29. The wall 27 is dimensioned to fit within the aperture 22. Downward outward slanted flange 28 on the exterior of wall 27 engages the top of panel 21 outside of the aperture 22.

A curling tool 31, which may be heated if desired, and which may be rotated, if desired, is elevated from the position of FIG. 1 into engagement with end 29, curling the same outward. A split backup tool 33 engages the fitment 26 on the opposite side of panel 21 to prevent the fitment from backing away from the panel 21. The completion of the operation shown in FIG. 2 results in a curl 34 being formed on the underside of panel 21 so as to crimp the panel 21 between the flange 28 and the end 29 of the curl 34. The means whereby this operation is performed is illustrated and described in detail in the aforesaid Thompson patents.

The shapes of the fitment and the closure are subject to considerable modification. In the embodiments shown in FIG. 3, fitment 26 has a spout body 36 formed with internal threads 37. A downward inward slanted flange 38 extends from the bottom of body 36. For tamper-evident purposes, a ratchet 39, well understood in the art and also described in some detail in the aforesaid patent applications is formed on the exterior of body 36 near the top. It will be understood that the location of the ratchet 39 is subject to variation.

Closure 46 as illustrated in FIG. 3 has a top 47 which is generally disk shaped, having a downward extending skirt 48. Skirt 48 is formed with external threads 49 which mate with the threads 37. Initially, the closure 46 and fitment 26 may be molded in a single shot molding operation and for such purposes, the theoretical projection of the runout of thread 49 is attached to the upper edge of body 36 in such manner that there is a line of weakness 51 where the parts join together. Either at the conclusion of the molding operation or subsequently, the cap 46 is depressed relative to the fitment 26, causing the line of weakness 51 to fracture and the threads 49 to slip over the threads 37 and then interengage so that the cap cannot be removed without unscrewing the same. The lower end 52 of skirt 48 is dimensioned and positioned so as to engage the flange 38 when the parts are assembled.

To make the parts further tamper-evident, a cylindrical top tamper-evident band 54 is formed around the outside of skirt 48. Radially spaced bridges 56 interconnect the band 54 and the body of the cap. In a particular form of the invention shown herein, vertical outward downward slanted ribs 53 are formed on the exterior of skirt 48 so as to facilitate turning the skirt and the bridges 56 are connected to and form parts of the lower edges of the ribs 53. It will be understood that the band 54 may be joined to the closure 46 by other means. Band 54 has a downward extending pawl 57 which engages ratchet 39 to prevent turning of closure 46 relative to fitment 26 until bridges 56 are fractured, thereby giving evidence of tampering.

The exterior of skirt 48 is formed with a locking flange 58 which is dimensioned to fit inside the upper edge of fitment body 36 to center the closure relative to the fitment.

In the modification of FIGS. 1-3, curl 34 is formed after the cylinder 27 of fitment 26 has been inserted through the aperture 22 in panel 21. FIGS. 4 and 5 show an alternate modification in which the curl 34a of wall 27a is formed prior to assembly of the fitment and the panel. Aperture 22a has a dimension detailed in FIG. 4 with the letter x and the thickness of the panel 21a by the letter y. The outside diameter of cylindrical wall 27a is equal to x+0.020 inches (approx.). The outside diameter of the curl 34a has a dimension x+0.100 inches (approx.). The dimension between the flange 28a and the completed curl 34a is y−0.020 (approx.) inches. By applying an angular backup tool 66 against the underside of the panel 21a and forcing the fitment 26a to the left, as viewed in FIG. 4, the curl 34a may be pushed through the aperture 22a and locked in place in the position shown in FIG. 5.

Figure 6:
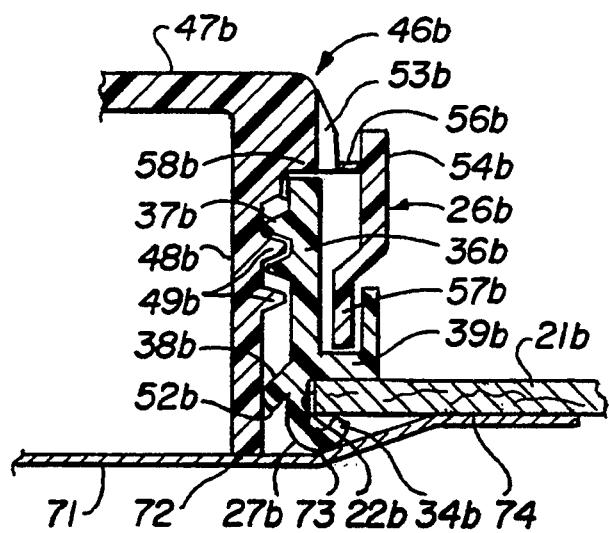
FIG. 6 is a view similar to view FIG. 3 of a modification wherein the closure has been applied to the fitment and a foil sheet welded to the panel, curl of the fitment and lower end of the skirt of the closure.

In the form of the invention shown in FIG. 6, the modification shown in FIG. 3 has been assembled so that the line of weakness 51 has been broken and the closure 46b installed inside the fitment 26b. A disk 71 of foil or plastic material is dimensioned larger than the diameter of the aperture 22b and is installed on the underside of the assembly shown on FIG. 6. The outer edge of disk 71 is attached to the underside of panel 21b by weld indicated generally at reference numeral 74. A second weld 73 connects the disk 71 to the curl 34b. A third weld 72 connects the disk 71 to the underside 52b of the skirt 48b of the closure 46b. This arrangement makes the container aseptic provided the container and the contents have been sterilized prior to filling the container with sterile product.

Many of the elements of the modifications of FIGS. 4 and 6 resemble those of the preceding modifications and the same reference numerals followed by subscripts *a* and *b*, respectively, are used to designate corresponding parts.

As used in the accompanying claims, the word "curl" means a member which in cross-section is curved outwardly and upwardly in a manner such that the wall 27 is curved outwardly and upwardly in curl 34, as viewed in FIG. 2, so that contact is made with the underside of panel 21 at a location spaced outwardly of aperture 22. The word "curlable" when referring to a material means that the material may be formed in such a curl.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An initially unitary fitment and closure combination, said fitment having a spout having upper and lower ends, a flange, said flange having a flat smooth surface facing said lower end of said spout, extending outwardly and downwardly from a line on said spout located intermediate said upper and lower ends, and attachment means on said spout for attaching said fitment to a container panel formed with an aperture, said closure having a top and a skirt depending from said top dimensioned to fit within said spout and having a lower end, cooperating seal means on said spout and skirt to seal said spout to said skirt when said skirt is within said spout and frangible means initially joining an outer surface of said skirt to said upper end of said spout, said attachment means comprising a thin cylindrical wall comprising part of said spout initially depending vertically downward below said flange, said cylindrical wall being formed of curlable material, said cylindrical wall being curled outwardly and upwardly in a curl located adjacent but spaced from said flange and engaging said container panel on a first side of said panel spaced outward from said aperture, said flange engaging said panel on a second side opposite said first side.

2. In combination, the combination of claim 1 and a container panel formed with an aperture dimensioned to receive said cylindrical wall, said flange being positioned on said second side of said panel, said cylindrical wall being curled outwardly to tightly engage said second side of said panel to crimp said panel to said fitment.

3. The combination of claim 2 in which said frangible means joins said fitment and closure so that said closure must be separated from said fitment by breaking said frangible means in order to get access to the container, thereby making said combination tamper-evident.

4. The combination of claim 2 in which said seal means comprises an exterior wall of said skirt and a flange on an interior wall of said spout bearing against said exterior wall of said skirt.

5. The combination of claim 2 in which said seal means comprises an exterior wall of said skirt and a downward-inward slanted flange on an interior wall of said spout bearing against said exterior wall of said skirt.

6. The combination of claim 2 which further comprises first and second engagement means on said fitment and said closure respectively to secure said fitment and closure together against unintentional separation.

7. The combination of claim 6 wherein said first and second engagement means comprise complementary helical threads.

8. The combination of claim 6 wherein said first tamper-evidencing means on said spout comprises a circumferentially extending ratchet and said second tamper-evidencing means comprises an outwardly extending pawl on an outside wall of said closure skirt dimensioned to fit into said ratchet when said closure is fully seated on said fitment.

9. The combination of claim 2 in which said skirt has a second outward extending surface larger than an interior of said spout to limit said closure from moving completely within said spout.

10. The combination of claim 1 which further comprises first tamper-evidencing means on said flange and second tamper-evidencing means on said closure engageable with said first tamper-evidencing means said first and second tamper-evidencing means having first and second interengaging means, respectively, which interengage so that said fitment and said closure cannot be separated after assembly without rupturing one of said tamper-evidencing means to provide visual evidence of tampering.

* * * * *